United States Patent [19]

Fuller, deceased

[11] Patent Number: 4,460,314
[45] Date of Patent: Jul. 17, 1984

[54] VIBRATION DAMPED ROTOR BLADES FOR TURBOMACHINES

[75] Inventor: John R. D. Fuller, deceased, late of Bristol, England, by Jean M. E. Fuller, executrix

[73] Assignee: Rolls-Royce Limited, London, England

[21] Appl. No.: 327,685

[22] Filed: Dec. 4, 1981

[30] Foreign Application Priority Data

Dec. 29, 1980 [GB] United Kingdom ................ 8041350

[51] Int. Cl.³ ............................................. F01D 5/10
[52] U.S. Cl. .................................... 416/145; 416/500
[58] Field of Search ........................ 416/144, 145, 500

[56] References Cited

U.S. PATENT DOCUMENTS

| | | | |
|---|---|---|---|
| 1,398,062 | 11/1921 | Brooks | 416/145 X |
| 1,833,751 | 11/1931 | Kimball | 416/500 X |
| 1,894,276 | 1/1933 | Lampton | 416/500 X |
| 2,085,769 | 7/1937 | Scott | 416/500 |
| 2,292,072 | 8/1942 | Hanna et al. | 416/500 X |
| 2,349,187 | 5/1944 | Meyer | 416/145 X |
| 2,689,107 | 9/1954 | Odegaard | 416/500 X |
| 2,999,669 | 9/1961 | McGinnis | 416/500 X |

FOREIGN PATENT DOCUMENTS

| | | | |
|---|---|---|---|
| 613323 | 1/1961 | Canada | 416/500 |
| 1947725 | 4/1971 | Fed. Rep. of Germany | 416/500 |
| 710766 | 8/1931 | France | 416/500 |
| 981599 | 5/1951 | France | 416/145 |
| 293099 | 2/1932 | Italy | 416/145 |
| 1271363 | 4/1972 | United Kingdom . | |
| 1272169 | 4/1972 | United Kingdom . | |

Primary Examiner—Everette A. Powell, Jr.
Attorney, Agent, or Firm—Parkhurst & Oliff

[57] ABSTRACT

A blade for a turbomachine having an aerofoil portion and a root portion. The blade is provided with a vibration damper for damping a predetermined vibration of the blade. The damper comprises a closed chamber 14 within the aerofoil portion 13 adjacent the tip of the blade, and liquid 15 within the chamber 14. The volume of liquid 15 is less than the volume of the chamber 14. The chamber 14 is shaped, positioned, and aligned relative to the blade, so that in use the liquid 15 is constrained to form a column which oscillates in the chamber 14 in radial directions and in the same directions as the vibration to be damped. The volume, mass, and viscosity of the liquid are all chosen in relation to the frequency vibration ($W_B$) of the vibration to be damped and the rotor speed ($W_E$) so that, in use, the length (L) of the column of liquid is such that $$\frac{W_E}{W_B} \sqrt{\frac{2R}{L}} \sim 1$$

where R = the blade tip radius. In this way the liquid 15 is caused to oscillate, under centrifugal loads, at a natural frequency which matches, or is close to, the resonant frequency of the vibration to be damped.

5 Claims, 6 Drawing Figures

DIRECTION OF VIBRATION TO BE DAMPED

VIBRATION DAMPED ROTOR BLADES FOR TURBOMACHINES

DESCRIPTION

This invention relates to blades for use in turbomachines, and is particularly concerned with damping vibrations induced in such blades.

With large compressor blades, for example, fan blades of a by-pass type gas turbine engine, it is known to use platforms, commonly called snubbers, at locations along the aerofoil portion to damp vibrations due to twisting, flutter and flapping of the blade. These snubbers interact with one another to form effectively a continuous platform which damps the vibrations. Such snubbers add undesirable weight; therefore the blade roots and the discs or drums on which the blades are mounted have to be considerably strengthened to withstand the high centrifugal forces on them. Furthermore, the provision of snubbers complicates the manufacturing and machining processes, compromises the aerodynamic efficiency of the blade, and introduces highly stressed zones at vulnerable regions of the blade. Therefore, there is a stong incentive to eliminate snubbers.

It is also known to provide turbine blades with tip shrouds which serve to minimize gas leakages at the blade tips, and provide damping of vibrations of the blades in much the same way as the snubbers do on compressor blades. Here again turbine rotor assemblies embodying blades with tip shrouds suffer from many of the disadvantages enumerated above, and there is a strong incentive to eliminate the use of tip shrouds and to deal with the problems of vibration damping and controlling tip seal clearances separately.

It is also known to damp shroudless blades by resilient blocks fitted under the root platform but this requires a larger chord blade to obtain sufficient flexure to enable damping to be effective. This in turn results in increased disc rim loads.

The claimed invention offers a way of damping vibrations induced in blades of turbomachines which do not have snubbers, tip shrouds, or other known vibration dampers.

The advantages offered by the claimed invention are mainly that the vibration damper is contained within the blade and so therefore does not compromise the aerodynamic efficiency of the blade. Furthermore, the design of vibration damper enables adequate damping to be achieved without imposing undue centrifugal forces on the blades and rotor assemblies on which the blades are mounted. In addition, the blades of the claimed invention are easier to manufacture and machine and hence are less costly to manufacture than blades provided with snubbers or tip shrouds.

The invention will now be described by way of an example with reference to the accompanying drawings in which.

Figure 1:
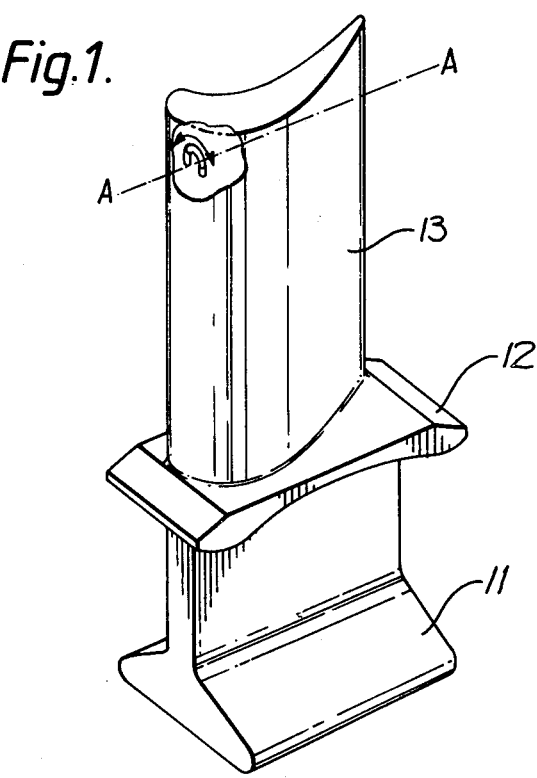
FIG. 1 illustrates a blade for a turbine rotor of a gas turbine aero engine constructed in accordance with the present invention.

Referring to FIG. 1 of the drawings there is shown a blade for a turbine or compressor rotor of a gas turbine engine.

The blade comprises a root portion 11, a platform 12 and an aerofoil portion 13.

The root 11 is of dovetail configuration whereby the blade may be mounted in a complementary shaped, axially extending, shaped slot in the rim of the respective compressor or turbine disc, or drum. Other shapes of root portions are possible and the slots in the disc or drum may extend axially or circumferentially.

Located within the aerofoil portion 11 adjacent the tip of the blade is a closed chamber 14 which is partially filled with a liquid 15. The term "liquid" as used herein is taken to include liquid metals such as mercury, materials such as lead or sodium, which at the operating temperature of the blade become liquid, or liquids such as glass which become less viscous at the operating temperature of the blade. The chamber 14 is dimensioned and shaped, and the volume of liquid and its mass and viscosity chosen, so that in use the resonant frequency of oscillation of the liquid 15 in the chamber 14, under centrifugal loads, matches or is close to the frequency of the principal mode vibration of the blade. The chamber 14 is shaped to provide, in use, a column of liquid 15 extending predominantly radially so that centrifugal loads on the column of liquid as the liquid oscillates, provides a large restoring force on the oscillating column of liquid thereby to damp the principal mode of vibration of the blade.

The chamber 14 is aligned so that the liquid 15 oscillates in the same direction as the principal mode of vibration of the blade; that is to say the region 19 where the radially extending portions of the chamber 14 are interconnected is aligned so that the liquid oscillates in this region 19 in the same direction as the principal mode of vibration of the blade.

The liquid does not fill the chamber 14 and any resistance to motion in the liquid results in energy being dissipated as heat. Since the chamber 14 is located at the position of maximum amplitude of the principal mode of vibration, this is conducive to high energy absorbtion. Furthermore, wear which would occur with other types of devices employing solid components in frictional engagement or solid oscillating masses is eliminated, or at least greatly reduced. Damping should also be obtained over a wide range of frequencies. If desired a blade may incorporate two or more chambers 14 each being partially filled with a liquid and each being tuned so that the combined damping due to the oscillating liquids in all the chambers of each blade matches the resonant frequency of each blade.

It has been found that a liquid mass of 1% of the mass of the aerofoil portion of the blade can give a logarithmic decrement of 0.35 corresponding to a Q value of 9.0, assuming that the viscous resistance to oscillation is within predetermined limits. Damping would be obtained at a particular predetermined R.P.M. and would decrease as the R.P.M. varied from the particular R.P.M.

Figure 2:
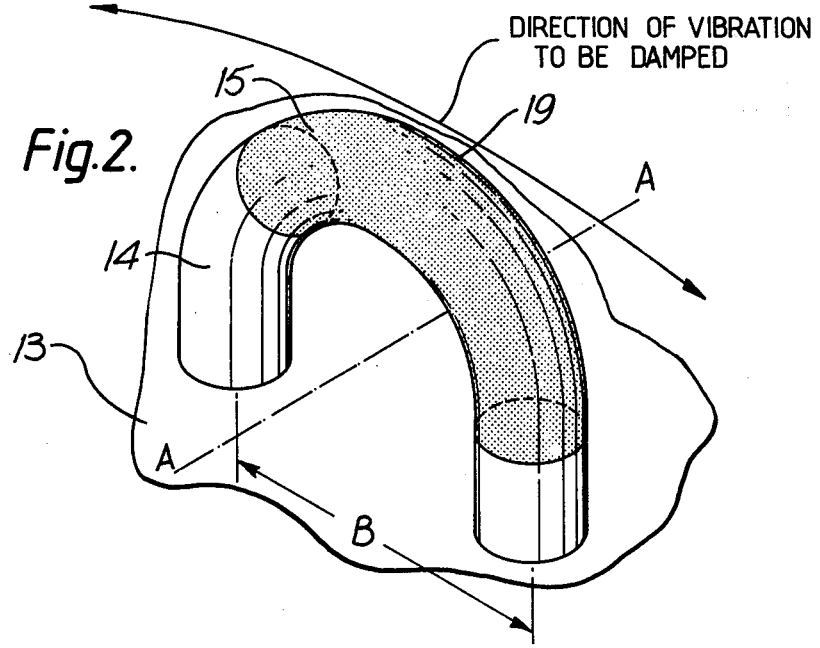
FIG. 2 illustrates in more detail a further form of vibration damper suitable for the blade of FIG. 1.

The invention will now be described in fuller detail with reference to FIG. 2 which shows a particular design of chamber 14 for a specific blade.

It is assumed that the chamber stationed at the blade tip is vibrating in simple harmonic motion and that the relatively small liquid mass does not affect blade frequency. The effect of this vibration on the liquid is taken into account by applying acceleration forces to the liquid, equivalent to the container acceleration and in the opposite direction.

Amplitude of liquid oscillation relative to containment chamber 14 is obtained from:

$$\frac{a_R}{a_B} \cdot \frac{L}{B} = \sqrt{\frac{1}{b^2 + c^2}}$$

Damping Logarithmic Decrement $\delta$, is obtained from:

$$\frac{\delta}{\frac{M}{K_E M_B}\left(\frac{B}{L}\right)^2} = \frac{\pi b}{b^2 + c^2}$$

Where $a_R$ = amplitude of liquid oscillation relative to chamber 14.

$a_B$ = blade tip amplitude
B = distance apart of 'limbs' of chamber 14
L = length of liquid column
M = liquid mass
$M_B$ = blade aerofoil mass $$K_E = \left[\frac{\text{Blade Vibrational Energy}}{\text{Energy of aerofoil mass vibrating at tip amplitude}}\right]$$

Figure 3:
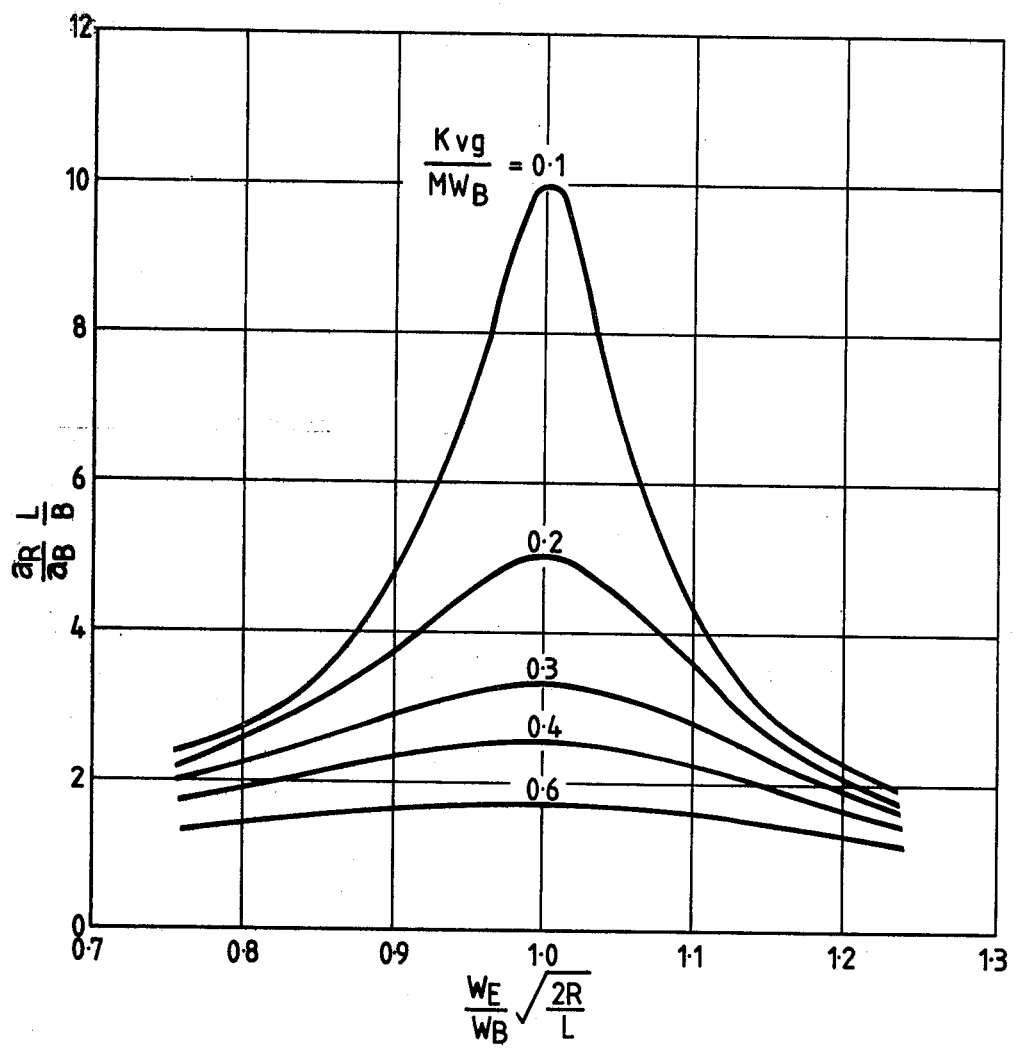
FIGS. 3 and 4 are graphs illustrating the relationship between turbine speed, frequency of vibration to be damped and the different damping characteristics for changes in the shape of the chamber and mass of the liquid.
Figure 4:
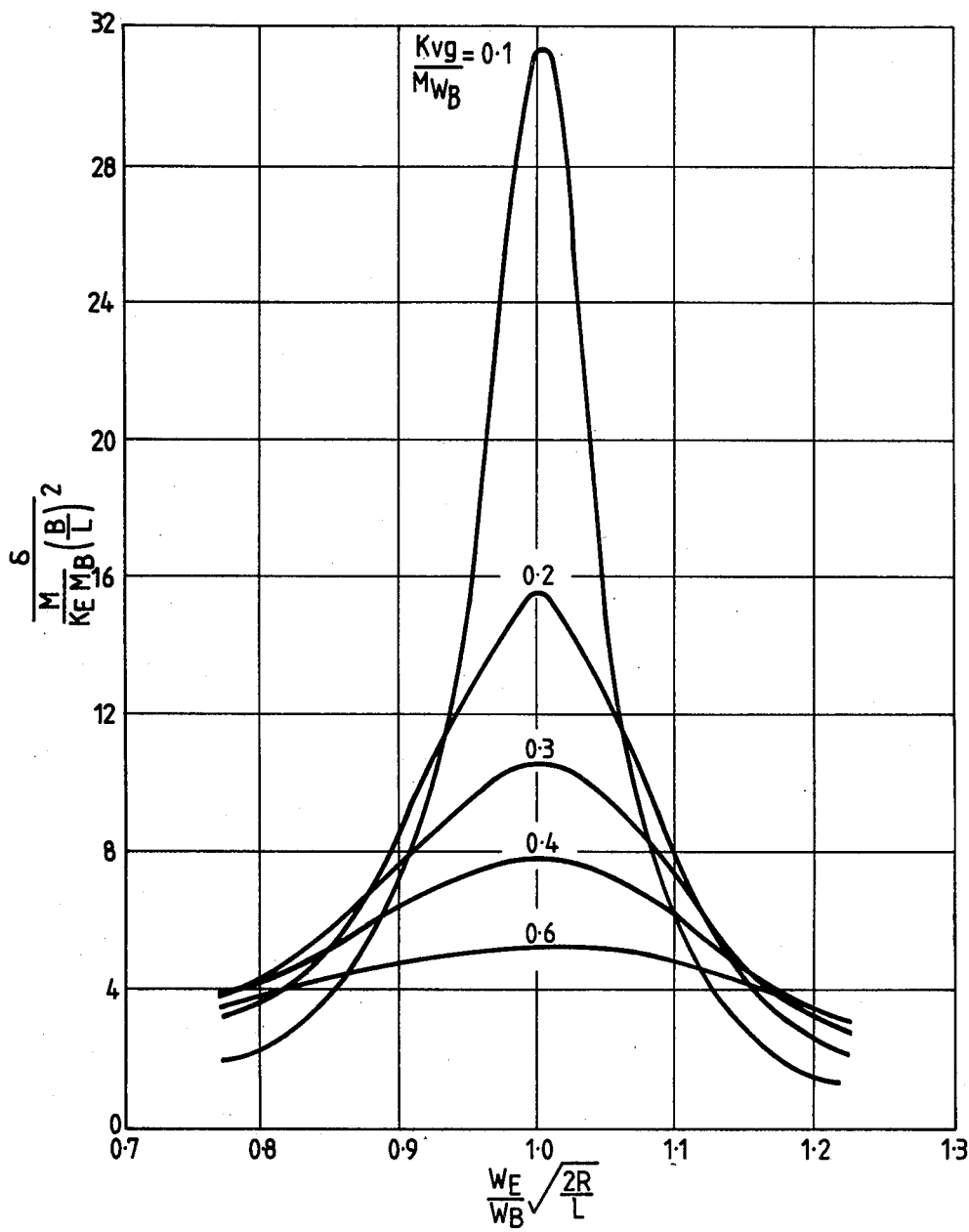

$b = [K_v g / M W_B]$

Where $K_V$ = viscous force on fluid per unit velocity relative to chamber.

g = gravitational acceln. (non dimensional numerical value).
M = Liquid mass
$W_B$ = Vibrational circular frequency (Rads/unit time)
= $2\pi \times$ frequency
Where C = $(2R/L)(W_E/W_B)^2 - 1$
Where R = blade tip radius
$W_E$ = Turbine rotational speed (Rads/unit Time)
Referring now to FIGS. 3 and 4.

$$\left[\frac{a_R}{a_B} \cdot \frac{L}{B}\right] \text{ and } \left[\frac{\delta}{\frac{M}{K_E M_B}\left(\frac{B}{L}\right)^2}\right]$$

are functions of $$\left[\frac{K_{vg}}{MW_B}\right] \text{ and } \left[\frac{2R}{L}\left(\frac{W_E}{W_B}\right)^2 - 1\right]$$

and are plotted in FIGS. 3 and 4 against $\left[\frac{K_{vg}}{MW_B}\right]$, and against $\left[\frac{W_E}{W_B}\sqrt{\frac{2R}{L}}\right]$ -continued rather than $\left[\frac{2R}{L}\left(\frac{W_E}{W_B}\right)^2 - 1\right]$ in order to show more directly the effect of variation in relative engine rotational speed and blade frequency.

It is seen that the maximum liquid relative amplitude and the maximum damping for given liquid and blade masses and $K_E$ and B/L values are obtained when $$\left[\frac{W_E}{W_B}\sqrt{\frac{2R}{L}}\right] = 1,$$

this being when the natural frequency of the liquid in its U chamber in the centrifugal "g" field at the blade tip, is equal to the blade frequency.

The effect of decreasing the value of $[K_v g/MW_B]$ is to increase maximum relative amplitude and damping at $$\left[\frac{W_E}{W_B}\sqrt{\frac{2R}{L}}\right] = 1$$

but with the damping falling off more rapidly with changes in this function.

In the design of a damper there is then the choice of very high damping for a narrow range of engine R.P.M. and blade frequency or lower maximum damping, less sensitive however, to variation in these quantities.

It is necessary for the length of the fluid column L, to be such that $$\frac{W_E}{W_B}\sqrt{\frac{2R}{L}} \sim 1$$

and the effectiveness of the damper will depend largely on how this length compares with the thickness of the blade tip in which the liquid is housed.

If L turned out to be much greater than the tip thickness the 'limbs' of the U shaped liquid column would have to be relatively long, the resulting low value of $(B/L)^2$ giving comparatively low damping. Thick tip section blades would be preferable for this form of damper.

It is difficult to calculate the viscous resistance to motion of a given liquid in its chamber. In other words it is difficult, without experimentation to ensure that a required value $K_v$ would obtain in practice. It may be that to obtain the required value, a liquid of considerably higher viscosity than the molten lead envisaged would be necessary - molten glass for instance. However, the comparatively low density of glass would reduce damping for a given volume. In the above described embodiment the required resistance to liquid motion has been assumed to be provided by viscous forces, but it might be possible and even preferable to obtain this resistance by providing some kind of restriction to the liquid motion in the containment chamber. Restriction by a small orifice might be more practicable than having to depend upon viscous forces.

With this arrangement, flow resistance would not then be directly proportional to velocity and the foregoing analysis would be invalid. However, it is believed that the energy dissipated by resistance to the damping liquid flow would be much the same if the mean resistances were about equal for the orifice restricted and the viscosity restricted cases.

The viscous resistance analysis will be used in the following example of practical application, in relation to a turbine blade having an Aerofoil Mass $M_B=0.036$ lb. Assume:

Turbine R.P.M. = 17000
Tip Radius = 9.3 in.
Blade frequency = 3350 hz - 1F

For maximum damping $$\left[\frac{W_E}{W_B}\sqrt{\frac{2R}{L}}\right] = 1$$

Assuming this is required at 17000 R.P.M. then:

$$\frac{1700}{60 \times 3350}\sqrt{\frac{2 \times 93}{L}} = 1$$

Required length of fluid column $L=0.13$ in.

A suitable value of $K_{vg}/MW_B$ has to be chosen. It is observed from graph 2 that a value of 0.1 would give high maximum damping, this falling off more however, with reduction in $(W_E/W_B\sqrt{2R/L})$ Let us assume a value of 0.2 for $K_{vg}/MW_B$. Even if this varied in practice over a range 0.1 to 0.3 the damping at $$\left[\frac{W_E}{W_B}\sqrt{\frac{2R}{L}}\right] = .9$$

would be little affected, and small variations in R.P.M. or blade frequency could easily give continuous running at this condition. From Graph 1 we obtain:

$$\left[\frac{a_R}{a_B}\frac{L}{B}\right] = 5_x \text{ maximum at } \frac{K_{vg}}{MW_B} = .2$$

We need an estimate of the liquid amplitude $a_R$ to decide the chamber additional volume necessary to allow motion. Assume blade tip amplitude×frequencey = 1.5 ft./sec.
(This is considered to be about the maximum value for acceptable fatigue life).

Then Tip Amplitude $a_B=0.0048$ in. and liquid amplitude $a_R=0.24(B/L)$ ins.

As $(B/L)<1$ then $a_R<0.024$ in.

It is seen that very little extra chamber volume is needed to accommodate the liquid amplitude.

Assuming a basic semi-circular shape for the chamber.

Then for a length of liquid
$L=0.13$ in. (measured at the mean diameter). Mean diameter $=0.13\times(2/\pi)=0.083$ in.

The radial thickness of the liquid needs to be sufficient to give an effective liquid mass but not so great as to invalidate the assumption made in the analysis, that the liquid could all be considered as subject to the same dynamic conditions.

Dimension B (FIG. 2) would suitably be 0.083 inches. A chamber length of 0.25 in. could be accommodated in the blade tip.

Then for lead as the liquid.

Liquid Mass $M = .13 \times .03 \times .25 \times .4$
$= .00039$ lb.

Then from Graph 2 we obtain $$\frac{\delta}{\frac{M}{K_E M_B}\left(\frac{B}{L}\right)^2} = 15.5 \text{ at } \left[\frac{W_E}{W_B}\sqrt{\frac{2R}{L}}\right] = 1$$

i.e., at 17,000 R.P.M.
We have $M/M_B=0.00039/0.036=0.0108$
$B/L=0.083/0.13=0.64$
$K_E=0.2$ (Approximate value)
This gives: logarithmic decrement=0.35
At $$\left[\frac{W_E}{W_B}\sqrt{\frac{2R}{L}}\right] = .9$$

i.e., at 15,300 R.P.M. for the same blade frequency $W_B$.

$$\frac{\delta}{\frac{M}{K_E M_B}\left(\frac{B}{L}\right)^2} = 8.5$$

giving $\delta=0.19$

These give Q factors i.e., $\pi/\delta$ of 9 and 17 at 17,000 and 15,300 R.P.M. respectively. These results require that:
$K_{vg}/MW_B=0.2$
i.e., $K_v=0.2$ $MW_{B/g}=0.0042$ lbf/in/sec.

High dampening is seen to be theoretically obtainable from a small liquid mass (about 1% of aerofoil mass) over a useful engine R.P.M. range, and it appears that the chamber dimensions desirable are compatible with the space available.

Figure 5:
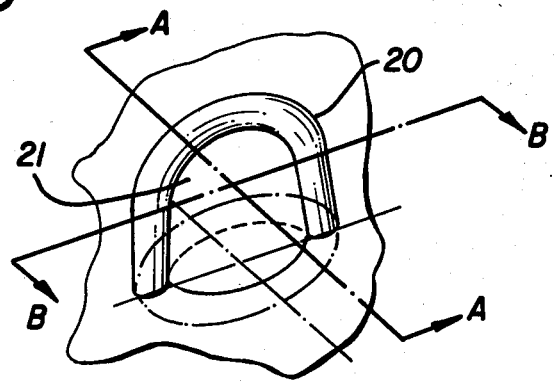
FIG. 5 shows another embodiment of a vibration damper according to the invention.
Figure 6:
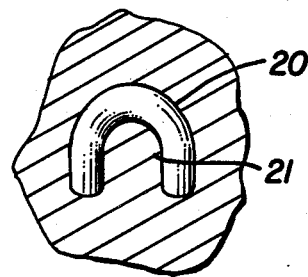
FIG. 6 shows a cross section along either of lines AA or BB of FIG. 5.

As seen in FIGS. 5 and 6, the chamber 14, instead of being a generally "U" shaped tube may be formed by two spaced walls; the radially outer one 20 of which is concave and the radially inner one 21 of which is convex. In one specific construction the inner and outer walls may be spaced hemispheres thus effectively forming a chamber which in any radial plane (shown on FIGS. 5 and 6 as planes AA and BB) is substantially "U" shaped.

In a further embodiment the chamber 14 may be a right-circular cylinder arranged with its axis normal to the direction of the vibration to be damped, and in this case the centrifugal loads on the liquid urges it into contact with the circumference of the cylinder so that effectively a generally "U" shaped liquid column is formed.

The volume of the chamber 14 not occupied by the liquid 15 is preferably evacuated or at least contains air or gas at a reduced pressure. In the case where the chamber 14 is a hollow cylinder (FIG. 2) or formed by spaced convex and concave walls, the chamber may contain air or gas providing that the liquid can displace the air or gas or compress it without impairing the operation of the damper.

I claim:

1. A blade for a turbomachine having an airfoil portion and a root portion, the blade being provided with a vibration damper for damping a predetermined vibration of the blade, the damper comprising a closed chamber "U"-shaped in cross section within the airfoil portion adjacent the tip of the blade, and a material within the chamber which, at least in use, is a liquid, the volume of liquid being less than the volume of the chamber, the chamber having a concave surface that faces toward the root portion and extends in a direction along the length of the airfoil portion to define a "U"-shaped path along which the liquid is constrained to oscillate, and the chamber being shaped, positioned, dimensioned and aligned relative to the blade so that the liquid forms a column which oscillates in the chamber in radial directions and the volume, mass and viscosity of the liquid being chosen in relation to the frequency ($W_B$) of the vibration to be damped, and the rotor speed ($W_E$) so that, in use, the length (L) of the column of liquid is such that $$\frac{W_E}{W_B} \sqrt{\frac{2R}{L}} \sim 1$$

where R = the blade tip radius, thereby to cause the liquid to oscillate in a "U"-shaped path under centrifugal loads, at a natural frequency which matches, or is close to, the resonant frequency of the vibration to be damped.

2. A blade according to claim 1 wherein the chamber is shaped to define two radially extending limbs interconnected at their ends nearest to the tip of the blade, so that in use centrifugal forces on the liquid cause it to oscillate from one limb to the other.

3. A blade according to claim 1 wherein the chamber is defined by the gap between a concave wall which is spaced from, and faces, a convex wall, and in use the concave wall faces towards the root portion.

4. A blade according to claim 1 wherein the liquid is a liquid metal.

5. A blade according to claim 1 wherein the liquid comprises a material which when not in use is non-liquid but in use is liquid at the operating temperature of the blade.

* * * * *